(12) United States Patent
Pellegrini (10) Patent No.: US 12,467,298 B2
(45) Date of Patent: Nov. 11, 2025

(54) DOOR SYSTEM FOR A VEHICLE AND VEHICLE WITH A DOOR SYSTEM

(71) Applicant: BODE—DIE TÜR GMBH, Kassel (DE)

(72) Inventor: Andreas Pellegrini, Kassel (DE)

(73) Assignee: BODE— DIE TÜR GMBH, Kassel (DE)

( * ) Notice: Subject to any disclaimer, the term of this patent is extended or adjusted under 35 U.S.C. 154(b) by 202 days.

(21) Appl. No.: 18/017,323

(22) PCT Filed: Jun. 9, 2021

(86) PCT No.: PCT/EP2021/065499
§ 371 (c)(1),
(2) Date: Jan. 20, 2023

(87) PCT Pub. No.: WO2022/017676
PCT Pub. Date: Jan. 27, 2022

(65) Prior Publication Data
US 2023/0287722 A1    Sep. 14, 2023

(30) Foreign Application Priority Data
Jul. 21, 2020   (DE) ..................... 20 2020 104 202.5

(51) Int. Cl.
*E05D 15/10*    (2006.01)
*E05D 15/56*    (2006.01)

(52) U.S. Cl.
CPC .......... *E05D 15/1068* (2013.01); *E05D 15/56* (2013.01); *E05Y 2201/22* (2013.01);
(Continued)

(58) Field of Classification Search
CPC ........ E05B 83/02; E05B 83/06; E05B 83/363; Y10T 292/1043; Y10T 292/1079; Y10T 292/308; E05D 15/1068; E05D 15/56
See application file for complete search history.

(56) References Cited

U.S. PATENT DOCUMENTS

| 5,253,452 A | 10/1993 | Goldbach |
| 2006/0225356 A1 * | 10/2006 | Jarolim ................... E05F 15/40 49/218 |

FOREIGN PATENT DOCUMENTS

| BR | 102014012415 A2 * | 2/2016 | ......... E05D 15/1068 |
| DE | 4230888 A1 | 3/1994 | |

(Continued)

OTHER PUBLICATIONS

International Search Report and Written Opinion for International Application No. PCT/EP2021/065499, International Filing Date Jun. 9, 2021 and Date of Mailing Sep. 24, 2021, 13 pages—Translated.

*Primary Examiner* — Christine M Mills
*Assistant Examiner* — Christopher F Callahan
(74) *Attorney, Agent, or Firm* — CANTOR COLBURN LLP (57) ABSTRACT

A door system for a vehicle, such as a rail vehicle, includes a door leaf movable from a closed state to an open state and vice versa. The door system includes a longitudinal beam extending along a longitudinal vehicle axis (X) and having a longitudinal guide in which the door leaf is movably guided; a transverse beam arranged firmly on the vehicle, which extends along a transverse vehicle axis (Y) substantially perpendicularly to the longitudinal beam, wherein the longitudinal beam is movably guided via a guiding device in a transverse guide of the transverse beam; and a locking device configured for blocking a relative displacement between the longitudinal and transverse beams in a locking position and for enabling a displacement of the longitudinal beam relative to the transverse beam in an open position. A door system of this type is more cost-effective and meets higher security standards during locking.

18 Claims, 4 Drawing Sheets

(52) U.S. Cl.
CPC ... *E05Y 2201/638* (2013.01); *E05Y 2201/684* (2013.01); *E05Y 2201/686* (2013.01); *E05Y 2201/71* (2013.01)

(56) References Cited

FOREIGN PATENT DOCUMENTS

| | | | | |
|---|---|---|---|---|
| EP | 0517334 | A1 | 12/1992 | |
| EP | 1767388 | A2 * | 3/2007 | .............. B60J 5/062 |
| WO | 2004065154 | A1 | 8/2004 | |

* cited by examiner

DOOR SYSTEM FOR A VEHICLE AND VEHICLE WITH A DOOR SYSTEM

CROSS REFERENCE TO RELATED APPLICATIONS

This application is a National Stage of PCT Application No. PCT/EP2021/065499 filed on Jun. 9, 2021, which claims priority to German Patent Application No. 20 2020 104 202.5, filed on Jul. 21, 2020, the contents of each of which are incorporated herein by reference thereto.

TECHNICAL FIELD

The present disclosure relates to a door system for a vehicle, particularly for a rail vehicle, comprising a door leaf that can be moved from a closed state into an open state and vice versa. In this case, the door system comprises a longitudinal beam extending along a longitudinal vehicle axis and having a longitudinal guide in which the door leaf is movably guided. In addition, the door system comprises a transverse beam arranged firmly on the vehicle, which extends along a transverse vehicle axis substantially perpendicularly to the longitudinal beam, wherein the longitudinal beam is movably guided via a guiding device in a transverse guide of the transverse beam. The door system further comprises a locking device configured for blocking a relative displacement between the transverse and longitudinal beams in a locking position and for enabling a displacement of the transverse beam relative to the longitudinal beam in an open position.

The present disclosure particularly relates to pivot sliding door systems, and in this case both to door systems with a single door leaf and door systems with two door leaves, the so-called double-leaf pivot sliding door systems. In the aforementioned closed state, a door portal formed on the vehicle is closed by the door leaf (or leaves), so that the passage of passengers (which is to be understood to mean the entry into and exit from the vehicle) is prevented. In the open position, the door leaf or door leaves are in a position in which the door portal is largely cleared (open) for passengers to pass through. The opening and closing movement of the door leaves is realized by an electro-mechanical drive device.

BACKGROUND

Such door systems generally have a locking device by means of which a secure locking of the door leaves (particularly in their closed position) is ensured. This is necessary in order to counteract an inadvertent opening of the door leaves while driving, for example. For when a vehicle having such a door system is driven, movements of the door leaves, which in the worst case may lead to the unwanted opening of the door leaves during driving, may result from forces acting on the door system or the door leaves (e.g. resulting from road bumps, accelerations or cornering). Moreover, such relative movements may result in the door leaves becoming jammed or displaced.

From the prior art, it is known to lock door leaves by lifting them into strikers, self-locking drives, locks on the portal or motor brakes. More modern locks lock the door system by means of rotary columns, lockable pivot arms or rotary latch locks. Many of the above-mentioned systems in this case use over-dead-center bearings.

The known systems frequently lack sufficient protection against vibrations or shocks. Moreover, the known systems generally cannot be locked far beyond a dead-center position, because due to a reversing movement carried out in the process, the door leaves can be moved in the opening direction relatively easily. Moreover, known locking devices require a larger force in order to overcome dead center than for producing the required sealing dimensions. Last but not least, the production, installation and commissioning of the known locking systems result in relatively large costs.

SUMMARY

Accordingly, the present disclosure provides a door system of the type mentioned in the introduction, which is less expensive compared with the known systems and which meet higher safety standards with regard to locking. The same object also the basis for the vehicle claimed with the disclosure.

The above-mentioned advantage is accomplished by providing a door system having the claimed features and a vehicle with a door system, which is configured in accordance with the disclosure and claimed features.

It must be noted that the features cited individually in the claims can be combined with each other in any technologically meaningful manner (also across the boundaries of categories, such as device, use and method) and represent other embodiments of the disclosure. The description, in particular in connection with the figures, additionally characterizes and specifies the disclosure.

It may also be noted that a conjunction "and/or" used hereinafter, which is situated between two features and links them to each other, should always be interpreted such that, in a first embodiment of the subject matter according to the disclosure, only the first feature may be provided, in a second embodiment of the subject matter according to the disclosure, only the second feature may be provided, and in a third embodiment of the subject matter according to the disclosure, both the first and the second feature may be provided.

According to the disclosure, there is proposed a door system for a vehicle, particularly for a rail vehicle, comprising a door leaf that can be moved from a closed state into an open state and vice versa, the door system comprising a. a longitudinal beam extending along a longitudinal vehicle axis and having a longitudinal guide in which the door leaf is movably guided;
b. a transverse beam arranged firmly on the vehicle, which extends along a transverse vehicle axis substantially perpendicularly to the longitudinal beam, wherein the longitudinal beam is movably guided via a guiding device in a transverse guide of the transverse beam;
c. a locking device configured for blocking a relative displacement between the longitudinal and transverse beams in a locking position and for enabling a displacement of the longitudinal beam relative to the transverse beam in an open position.

The door system is characterized in that the locking device comprises a locking disk pivotably mounted on the guiding device, wherein the locking disk can be pivoted, using a drive device operatively connected to the locking disk, and while carrying out an unlocking pivoting movement, from a first final position to a second final position when unlocking the locking device, and wherein the longitudinal beam and the transverse beam, when carrying out the unlocking pivoting movement, are non-displaceable relative to each other over a predetermined free motion angle value of the locking disk.

In particular, the locking device configured in accordance with the disclosure is characterized by its small space requirements, which is why it can be labeled as being particularly space-saving. Moreover, a drive device, which is provided on most door systems anyway, can be used for operating the locking device, which simplifies the construction and installation of a door system according to the disclosure.

As was already mentioned above, a door system configured in accordance with the disclosure is particularly suitable for implementation or use in vehicles. In the present case, a "vehicle" can be understood to refer to a rail vehicle, e.g. a streetcar, an underground train, a tram, an urban-suburban commuter railway train (S-Bahn), a commuter train, a long-distance train or other railbound passenger transport means. A "vehicle" in the sense of the disclosure can also be understood to refer to a wheeled passenger transport means, e.g. a bus. In principle, the use of a door system according to the disclosure in other vehicles, such as aircraft or ships, is also conceivable, provided they have a door system.

In particular, the above-mentioned longitudinal beam is manufactured from metal, a load-stable plastic or a composite material and has a longitudinal guide extending over at least a partial length of the longitudinal beam. The guide may also extend over the entire length of the longitudinal beam. The door leaf is movably guided in the longitudinal guide. In the case of a double-leaf pivot sliding door, both door leaves can be guided in the longitudinal guide. Likewise, in a double-leaf pivot sliding door, two separate longitudinal guides may be formed in the longitudinal beam, wherein one of the door leaves, respectively, is guided in each of the longitudinal guides. The door leaf or door leaves may be guided via suitable load bearing structures, whose specific configuration is not the subject matter of the present disclosure, however. The longitudinal guide may be configured in the form of a guide channel, guide track, guide groove or guide rail. In this case, the longitudinal guide may cooperate with a roller-mounted or carriage-mounted load bearing structure, wherein the load bearing structure is attached to the door leaf on the one hand and guided in the longitudinal guide on the other hand.

As was already mentioned, a transverse beam extending along the transverse vehicle axis and substantially perpendicularly to the longitudinal beam is provided according to the disclosure. In a double-leaf pivot sliding door system, two transverse beams may be provided and arranged opposite each other. A "substantially perpendicular" arrangement is to be understood to refer to production-related or installation-related tolerances that may result in a slight deviation in an arrangement angle of 90° between the longitudinal and transverse beam. The transverse beam has a transverse guide that may be configured in the form of a guide channel, guide track, guide groove or guide rail. On the one hand, the above-mentioned guiding device is in this case connected to the longitudinal beam, on the other hand, it is movably guided or mounted in the transverse guide. Due to the coupling to the longitudinal beam, a relative movement of the guiding device relative to the transverse beam, which can be produced by means of the drive device, thus results in the longitudinal beam being carried along, and thus to a transverse movement of the longitudinal beam relative to the transverse beam. The transverse beam is mounted firmly on the vehicle or integrated into a portion of the vehicle.

As was already mentioned, a door system according to the disclosure comprises a locking device. The latter can take up both a locking position as well as an open position. In the locking position the locking device blocks a relative displacement between the transverse and longitudinal beams. However, "blocking" in this context is not supposed to mean that the transverse and longitudinal beams are completely rigidly arranged relative to one another in the locking position of the locking device. Of course, an admissible play between the components, i.e. a slight relative movement, may be permitted. In the open position of the locking device, the transverse beam can be moved, in particular displaced, relative to the longitudinal beam. If the locking device is in its open position, opening the door leaves by means of a pivot-sliding movement is possible. However, the locking device provides for the door leaves being secured against inadvertent opening in the closed state.

According to the disclosure, the locking device comprises a locking disk pivotably mounted on the guiding device. In this case, the pivotable mounting is configured such that the locking disk is pivotable about a longitudinal axis oriented parallel to the longitudinal beam. When unlocking the locking device, the locking disk is pivoted, using a drive device operatively connected to the locking disk, while carrying out an unlocking pivoting movement, from a first final position to a second final position, i.e. it is rotated about the above-mentioned longitudinal axis. When the unlocking pivoting movement is carried out, the longitudinal beam and the transverse beam are non-displaceable relative to each other over a predetermined free motion angle value of the locking disk, i.e., there is no relative displacement between the longitudinal and the transverse beams, but a free motion, across a predetermined pivoting angle of the locking disk about the longitudinal axis (free motion angle value). Thus, the locking disk rotates freely during the free motion, which may be used, for example, for driving additional locking members or other components by means of the drive device. In a double-leaf pivot sliding door system, the locking device may be configured with redundance, i.e., between both transverse beams and the longitudinal beam, one locking device may be respectively provided for each of the door leaves. The locking disks, which in this case are provided twice, can be set into a pivoting movement (e.g. the unlocking pivoting movement) by means of a common drive device. This preferably takes place simultaneously and synchronously.

A relative movement, i.e. relative displacement, between the longitudinal beam (including the door leaves guided therein) and the transverse beam takes place not until the locking disk is pivoted by an extent exceeding the free motion angle value. In the reverse process, i.e. when locking, the locking disk is pivoted in a direction opposite to the unlocking pivoting movement, i.e. from the second final position in the direction of the first final position. Also in this case, the free motion angle value has to be overcome prior to reaching the first final position.

The advantageous embodiments specified in the dependent claims and other advantageous (or possible) embodiments of the door system proposed by the disclosure are described in detail below.

According to a first embodiment of the disclosure, it may be provided that, for locking the locking device, the locking disk can be pivoted from the second final position to the first final position using the drive device, and while carrying out a locking pivoting movement. The above-mentioned pivoting movement in this case refers to the reverse movement of the locking disk in relation to the previously described unlocking. The pivoting direction of the locking disk during locking is opposite to the pivoting direction during unlocking. Accordingly, the drive device is capable of turning or rotating in two pivoting directions.

According to another embodiment of the disclosure, it may be provided that the locking disk has an elongated-hole opening, which is formed like a curve and in which a guide member, which is non-displaceably arranged on the transverse beam, is at least partially accommodated and guided. An elongated-hole opening is to be understood to mean that the opening (among other things, this may be a recess or cut-out in the material) has a greater length than width. In this case, it is advantageous that the elongated-hole opening does not extend across the entire locking disk but is formed in a section of the locking disk. The elongated-hole opening primarily extends in a plane of the locking disk situated crosswise to the vehicle longitudinal direction. The locking disk is preferably made from a metal, a mechanically stable plastic or a composite material. A guide member being "at least partially accommodated" may be understood to mean that the guide member protrudes into the elongated-hole opening with a section or in its entirety. In this case, the guide member may be adapted with regard to its largest cross-sectional diameter to the inner diameter of the elongated-hole opening. The largest cross-sectional diameter may also be smaller than the inner diameter of the elongated-hole opening. The guide member may be lubricated with a lubricant with respect to the elongated-hole opening in order to avoid unnecessary friction. The guide member may have a round (e.g. circular) or rounded cross section. For example, the guide member may be configured in the shape of a rounded bolt or pin. A spherical shape of the guide member is also an option. The guide member is non-rotatably and non-movably mounted or flange-mounted on the transverse beam. The guide member may also be welded to the transverse beam. Thus, the guide member may be an integral constituent element of the transverse beam, or an additional component connected to the transverse beam. Since the guide member is guided in the elongated-hole opening, the position of the guide member in relation to the elongated-hole opening can be changed by the pivoting of the locking disk. Thus, the guide member slides along the elongated-hole opening when the locking disk pivots. Since the guide member is in this case firmly arranged on the vehicle (by being formed on or attached to the transverse beam), actually, the elongated-hole opening slides in relation to the guide member (the former is moved by the pivoting of the locking disk). A curve-like configuration of the elongated-hole opening is to be understood to mean that the latter, over its length, extends like a curved track across the locking disk. A curved track may be understood to mean a circular track, an arcuate track, an elliptical track or other curved track. According to the disclosure, the curved track at least undergoes a change of its operational sign. The elongated-hole opening is configured such that a continuous movement in the vehicle transverse direction is produced by sliding along the guide member.

According to another embodiment of the disclosure, it may be provided that, in the locking position, the guide member is positioned in a first end position in the region of a first elongated-hole end. In this case, the guide member may rest with an outer portion against the first elongated-hole end (i.e. be supported by the inner circumference of the elongated hole) or be positioned in its immediate vicinity.

According to another embodiment of the disclosure, it may be provided that the elongated-hole opening is configured such that the locking disk, when pivoting it by the free motion angle value, is displaced relative to the guide member such that the guide member undergoes a change of position from the first end position to an engaging position, wherein the engaging position is a position in the region of the elongated-hole center. Advantageously, the change of position of the guide member from the first end position to the engaging position corresponds approximately to half of the length of the elongated-hole opening. The "free motion angle value" means that the locking disk, when pivoting by an angle resulting in the above-mentioned change of position between the guide member and the elongated-hole opening (from the first end position to the engaging position), does not cause any relative movement between the transverse and longitudinal beams; this actually is a free movement. In the engaging position, the locking disk is in a position similar to dead center. Moving the longitudinal beam relative to the transverse beam is not possible in this position. Thus, in every position of the locking disk in which the locking disk is not pivoted beyond the free motion angle value, the door system is locked. Only when the locking disk is pivoted further (beyond the free motion angle value) does a relative movement between the transverse and longitudinal beams become possible. The drive device can cause the locking disk to be pivoted further (beyond the free motion angle value).

In the locking position, the locking disk is arranged in an over-dead-center-like position, whereas the locking disk, in a position corresponding to the engaging position of the guide member in the elongated-hole opening, is arranged in a dead-center-like position. Accordingly, a displacement of the slider plate coupled to the locking disk relative to the transverse beam is prevented in the dead-center-like position. This can only take place by exerting more drive force and pivoting the locking disk further.

According to another embodiment of the disclosure, it may be provided that the elongated-hole opening is configured such that the locking disk, when the locking disk is pivoted beyond the free motion angle value, is displaced relative to the guide member such that the guide member undergoes a change of position from the engaging position via an intermediate position in the region of a second elongated-hole end to a second end position in the region of the elongated-hole center. As was already mentioned, a relative movement between the transverse and longitudinal beams may take place in the case of such further pivoting. In this case, the guiding device movably guided in the transverse guide of the transverse beam undergoes a relative displacement relative to the stationary transverse beam and carries the longitudinal beam along. In the reverse process of locking, the guide member first changes its position from the second end position (in the region of the elongated-hole center) via the intermediate position (in the region of the second elongated-hole end) towards the engaging position. In the process, the locking disk is pivoted (by means of the drive device) in a direction opposite to the pivoting direction during the unlocking pivoting movement. Accordingly, a locking pivoting movement takes place. After reaching the engaging position of the guide member and a pivoting beyond that in the direction of the locking pivoting movement, there is a transition into a free motion when a predetermined locking pivot angle is exceeded, so that there is no relative movement any more between the transverse and the longitudinal beams. The locking pivot angle and the free motion pivot angle add up to a total angle by which the locking disk can be pivoted by means of the drive.

According to another embodiment of the disclosure, it may be provided that the second end position of the guide member (in the region of the elongated-hole center) relative to the locking disk corresponds with the locking position of the locking device. In this position, no further pivoting of the locking disk in a pivoting direction corresponding to the unlocking pivot movement can take place. A pivoting of the locking disk in the direction of the locking position has to be caused by the drive device, i.e. is blocked by the drive.

According to another embodiment of the disclosure of the disclosure, it may be provided that the guiding device has a guiding bar, which is accommodated at least in some portions in a guiding sleeve of the longitudinal beam, and wherein the guiding bar is non-displaceably and non-rotatably connected to a slider plate, which is displaceably mounted in the transverse guide of the transverse beam with a sliding device. The guiding bar extends substantially along the longitudinal vehicle axis, i.e. along an axis extending parallel to the longitudinal beam. In contrast, the main extending direction of the slider plate extends perpendicularly to the guiding bar, i.e. in a direction parallel to the transverse beam.

The non-displaceable and non-rotatable connection of the guiding bar to the slider plate may be realized by means of a screw connection, for instance. Other fastening variants are also conceivable, e.g. a rivet connection, welded connection etc.

For example, the sliding device may be configured in the form of two rollers connected to the slider plate, wherein the rollers are accommodated and movably guided in the transverse guide of the transverse beam. According to an advantageous embodiment, the guiding bar may be connected to the slider plate and the sliding device by means of a threaded bolt. In this case, the threaded bolt may have a male thread and screwed into a threaded opening formed on the guiding bar, or reach into it, wherein the threaded opening has a female thread corresponding to the male thread of the threaded bolt. The threaded bolt and the threaded opening provided on the guiding bar extend parallel to the longitudinal beam. The slider plate may be clamped between an end of the guiding bar facing towards the transverse beam and a threaded-bolt head. Moreover, an attachment member for attaching the sliding device may be provided on the threaded-bolt head. In a double-leaf pivot sliding door system, the longitudinal beam has on each of its two ends one guiding sleeve for accommodating a respective guiding bar. The above-described arrangement of the guiding sleeve, the guiding bar, the slider plate and the sliding device (and their attachment by means of a threaded bolt) is thus provided twice in a double-leaf pivot sliding door system.

According to another embodiment of the disclosure, it may be provided that the locking disk is rotatably mounted on an outside section of the guiding bar. For this purpose, the locking disk may have a hole opening which is adapted, with respect to its inner diameter, to the outer diameter of the guiding bar, so that a rotatable mounting of the locking disk on the guiding bar is made possible. In the longitudinal direction, the locking disk supported on the guiding bar is delimited by the longitudinal beam on the one side and by the slider plate on the other side, so that a longitudinal displacement of the locking disk is prevented by the guiding bar.

According to another embodiment of the disclosure, it may be provided that the guiding bar and the slider plate connected therewith provide a carrier assembly for the longitudinal beam, which is configured for carrying along the longitudinal beam when the carrier assembly is displaced relative to the transverse beam. During unlocking, the guiding device, particularly the slider plate, can be displaced in the transverse guide by means of the sliding device when the locking disk is pivoted beyond the free motion angle value.

Due to the non-rotatable connection between the sliding device, the slider plate, the guiding bar and the longitudinal beam, it is ensured that the longitudinal beam is carried along in the case of a transverse displacement of the sliding device including the components connected therewith along the transverse guide.

According to another embodiment of the disclosure, it may be provided that the locking disk is arranged between the longitudinal beam and the transverse beam, and that the slider plate is arranged between the locking disk and the transverse beam. It may also be advantageous if the above-mentioned components are detachably fastened in order to be able to replace individual components in case of maintenance or damage. A detachable connection also facilitates the installation in already existing door systems, which can retrofitted in this manner with the construction according to the disclosure.

According to another embodiment of the disclosure, it may be provided that the elongated-hole opening extends across a section of the locking disk in an arc-shaped, in particular boomerang-shaped manner. The above-mentioned description of a geometric shape relates to an extent of the elongated-hole opening in a vertical plane extending parallel to the transverse beam (perpendicularly to the longitudinal beam), or to a top view onto the locking disk. An arc-shaped extent is to be understood to mean that the elongated-hole opening is not absolutely required to extend along the geometric shape of a partial circle, i.e. the curve-shaped extent does not have to have a constant radius—in relation to an imaginary center point-rather, the former may be variable. A boomerang-shaped extent of the elongated-hole opening may be expressed in the shape of legs of the elongated hole arranged at an angle in relation to the elongated-hole center, wherein the legs of the elongated hole are preferably angled at the same angle to the elongated-hole center.

As was already indicated, it may be provided, according to another embodiment of the disclosure, that the free motion angle value corresponds to a change of position of the guide member relative to the locking disk (or to the elongated-hole opening of the locking disk relative to the guide member) from the first end position in the region of the first elongated-hole end to the engaging position in the region of the elongated-hole center. Pivoting the locking disk about a longitudinal axis of the guiding bar (the locking disk is supported on the guiding bar) by the free motion angle value results in the above-mentioned change of position between the guide member and the elongated-hole opening (from the first end position to the engaging position).

According to another embodiment of the disclosure, it may be provided that a toothed portion, with which a toothed portion of a drive member, in particular of a drive wheel, engages, is disposed on the locking disk. The toothed portion arranged or formed on the locking disk is preferably arranged on an outer circumferential portion of the locking disk. Due to the engagement of the toothed portion of the drive member with the toothed portion of the locking disk, a rotation of the drive member can cause an opposite rotation or pivoting of the locking disk. Thus, the door system can be unlocked and locked by means of the drive member (the latter is connected to the drive device, e.g. via a rod system). The rotary movements of the drive wheel or locking disk carried out during unlocking and locking are opposite to each other.

According to another embodiment of the disclosure, it may be provided that the locking disk and the drive member are rotatably mounted on axes of rotation that are parallel to each other, which is found to save much constructional space. In a double-leaf pivot sliding door system, a drive member is provided in the region of both ends of the longitudinal beam in order to make the respective locking disks rotate. The driving members may be operated by means of a common rod system and a common drive unit, or by means of separate drive units (including rod systems).

According to another embodiment of the disclosure, it may be provided that, in relation to a transverse vehicle plane (meaning a vertical plane), which extends parallel to the transverse beam and perpendicularly to the longitudinal beam, the center point of an imaginary segment of a circle, which extends along a leg of the elongated hole that is directly adjacent to the first elongated-hole end, coincides with the axis of rotation of the locking disk. The above-described free motion is made possible by such an arrangement. Therefore, pivoting the locking disk from the first final position by the free motion angle value has no effect on a possible displacement of the sliding plate, which is connected to the locking disk, along the transverse beam.

According to another embodiment of the disclosure, it may be provided that the locking device is configured and arranged such that, when the locking disk is pivoted by the free motion angle value, an arrangement in space of the axis of rotation of the drive member, the axis of rotation of the locking disk and an axis of symmetry of the guide member relative to one another is constant. This means that a relative positional shift of the above-mentioned axes does not occur during a displacement of the locking disk by an angle of rotation within the range of the free motion angle value. This arrangeability or property of the above-mentioned axes enables a dead-center-like positioning of the locking disk when the guide member reaches the engaging position. Moreover, this enables an over-dead-center-like position of the locking disk when the guiding member is positioned in the first end position (in the region of the first elongated-hole end).

According to another embodiment of the disclosure, it may be provided that the guide member is a guiding cam or guiding pin. The guiding cam or guiding pin may be flange-mounted, welded or otherwise attached to the transverse beam. The guiding cam or guiding pin can be configured in a bolt-like manner, i.e. have a round cross section. In addition, the guiding cam may be accommodated in an opening of the transverse beam or screwed to the latter in a non-movable manner.

As was mentioned in the introduction, the advantage on which the disclosure is based is also accomplished with a vehicle comprising a door system according to the disclosure.

BRIEF DESCRIPTION OF THE DRAWINGS

Other features and advantages of the disclosure become apparent from the following description of an exemplary embodiment of the disclosure, which is to be understood not to be limiting and which will be explained below with reference to the drawing. In this drawing.

DETAILED DESCRIPTION OF THE DRAWINGS

Figure 1:
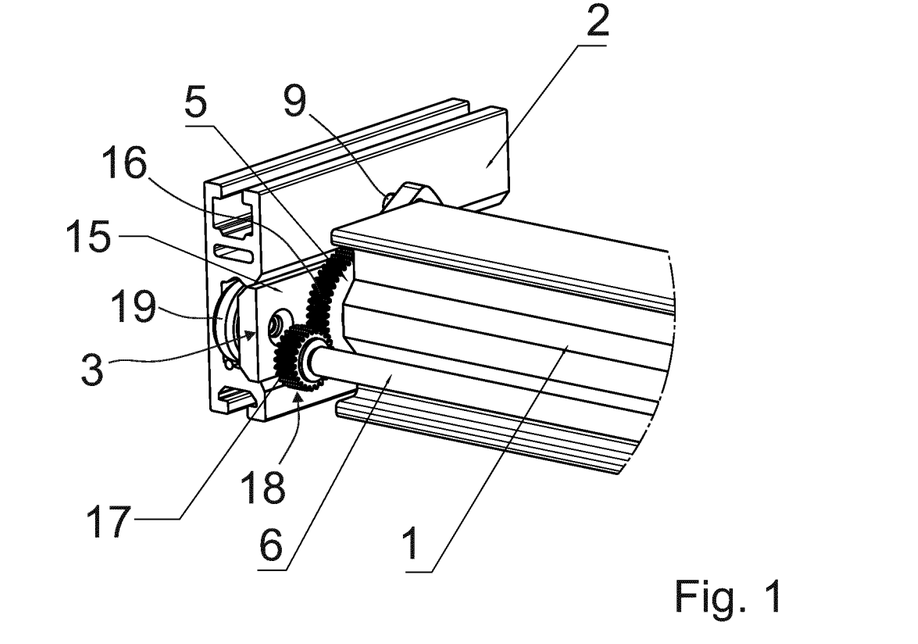
FIG. 1 shows a perspective rear view of a section of a door system according to the disclosure.
Figure 2:
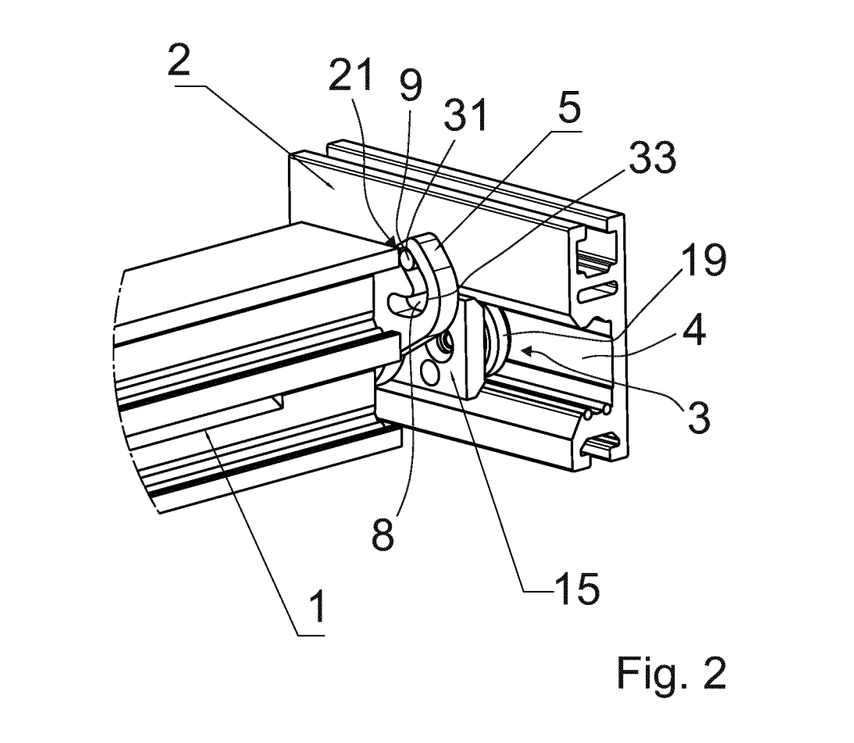
FIG. 2 shows a perspective front view of a section of a door system according to the disclosure.

FIGS. 1 and 2 show a section of a door system according to the disclosure in a first and second perspective view. Depicted is a section of a longitudinal beam 1, which extends along a longitudinal vehicle axis X, of a pivot sliding door system, in whose longitudinal guide two door leaves are displaceably mounted (not shown). The examples shown in the Figures are a double-leaf pivot sliding door system, i.e. all of the components shown in the detailed views (e.g. FIGS. 1 to 3) are provided on both ends of the longitudinal beam 1 (see FIG. 4).

As is shown in FIGS. 1 and 2, a transverse beam 2 including a transverse guide 4 is arranged transversely to the longitudinal beam 1. The transverse beam 2 extends along a transverse vehicle axis Y. As is apparent from FIG. 4, two transverse beams 2 are provided in the exemplary embodiment shown here. The transverse beams 2 are attached to the vehicle, i.e. arranged firmly on the vehicle. The longitudinal beam is movably guided in the transverse guides 4 of the transverse beams 2 via a guiding device 3.

A slider plate 15 is displaceably mounted or guided in the respective transverse guide 4. In the present example, the slider plate 15 is guided in the transverse guide 4 by means of a sliding device 19, in particular by means of rollers.

Figure 3:
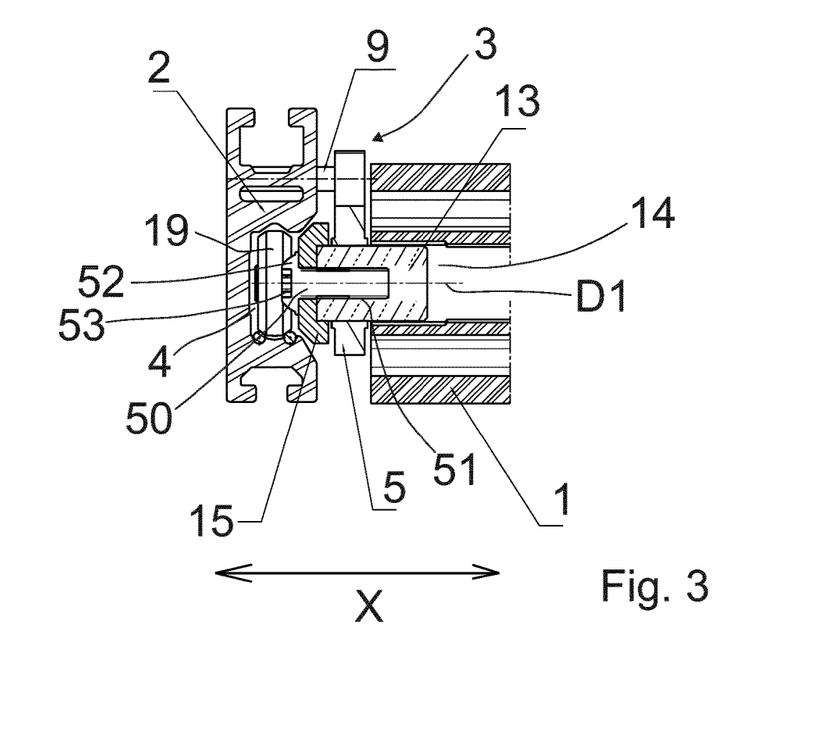
FIG. 3 shows a partial sectional view in a longitudinal section through the axis of a guiding bar accommodated in the longitudinal beam, including the components connected therewith.
Figure 4:
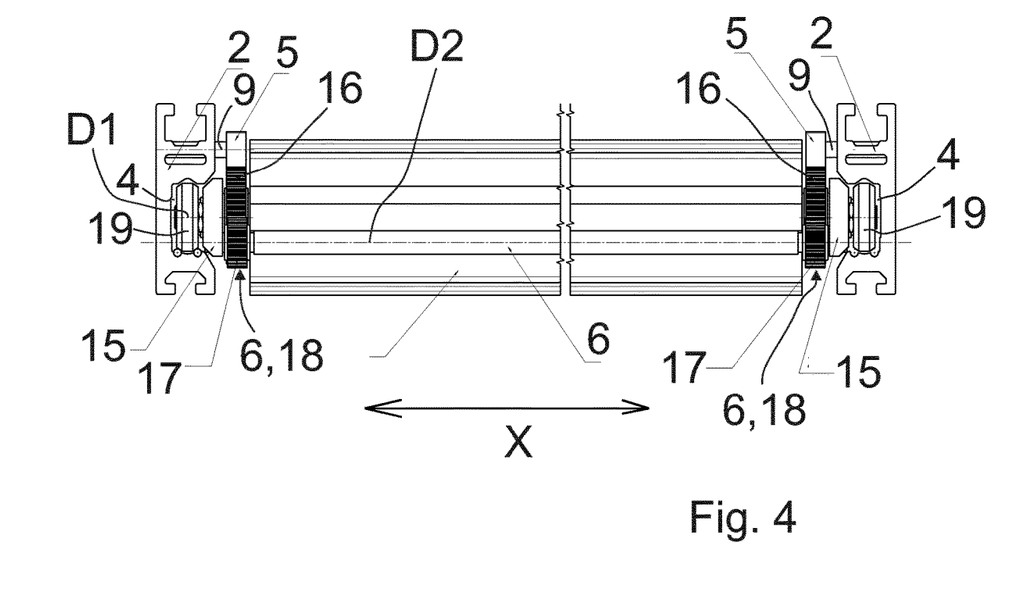
FIG. 4 shows a schematic rear view of a section of a double-leaf pivot sliding door system according to the disclosure, which shows the bilateral arrangement of a locking device in relation to the ends of the longitudinal beam.

FIG. 3 shows that the guiding device 3 further comprises a guiding bar 13 which is at least in some portions accommodated in a guiding sleeve 14 of the longitudinal beam 1. In this case, the guiding bar 13 is connected to the slider plate 15 in a non-displaceable and non-rotatable manner. In this case, the guiding bar 13 is connected to the slider plate 15 and the sliding device 19 by means of a threaded bolt 50. Moreover, the threaded bolt 50 is accommodated in the guiding bar 13, i.e. in a threaded opening 51. Thus, the guiding device 3 provides a connection between the longitudinal beam 1 and the sliding device 19 guided in the transverse guide 4 of the respective transverse beam 2, which makes a relative displacement of the longitudinal beam 1 relative to the transverse beam 2 possible in principle.

The threaded bolt 50 and the threaded opening 51 provided on the guiding bar 13 extend parallel to the longitudinal beam 1. The slider plate 15 is clamped between an end of the guiding bar 13 facing towards the transverse beam 2 and a threaded-bolt head 52. Moreover, an attachment member 53 for attaching the sliding device 19 is provided on the threaded-bolt head 52.

As the Figures also show, the door system further comprises a locking disk 5 pivotably mounted on the respective guiding device 3, wherein the locking disk 5 can be pivoted, using a drive device 6 operatively connected to the locking disk 5, and while carrying out an unlocking pivoting movement, from a first final position 11 (see FIG. 5) to a second final position 12 (see FIG. 8) when unlocking the locking device. The drive device 6 comprises a drive member 18 provided with a toothed portion 17, wherein the toothed portion 17 engages with a toothed portion 16 of the locking disk 5. The drive device 6 is connected to a drive unit (not shown) via a rod assembly. The locking disk 5 and the drive member 18 are rotatably mounted on axes of rotation D1, D2 that are parallel to each other (see FIG. 5, for example).

What is characterizing for the present disclosure is that, when the unlocking pivoting movement of the locking disk 5 is carried out over a predetermined free motion angle value L of the locking disk 5, the longitudinal beam 1 and the transverse beam 2 are non-displaceable relative to each other. In this case, there is no displacement of the slider plate 15 relative to the transverse guide 4 of the transverse beam 2 (see FIGS. 5, 6).

As particularly FIGS. 5 to 8 show, the locking disk 5 has an elongated-hole opening 8, which is formed like a curve and in which a guide member 9, which is non-displaceably arranged on the transverse beam 2, is at least partially accommodated and guided. The elongated-hole opening 8 extends across a section of the locking disk 5 in a boomerang-shaped manner from a first elongated-hole end 31 to a second elongated-hole end 32.

Figure 5:
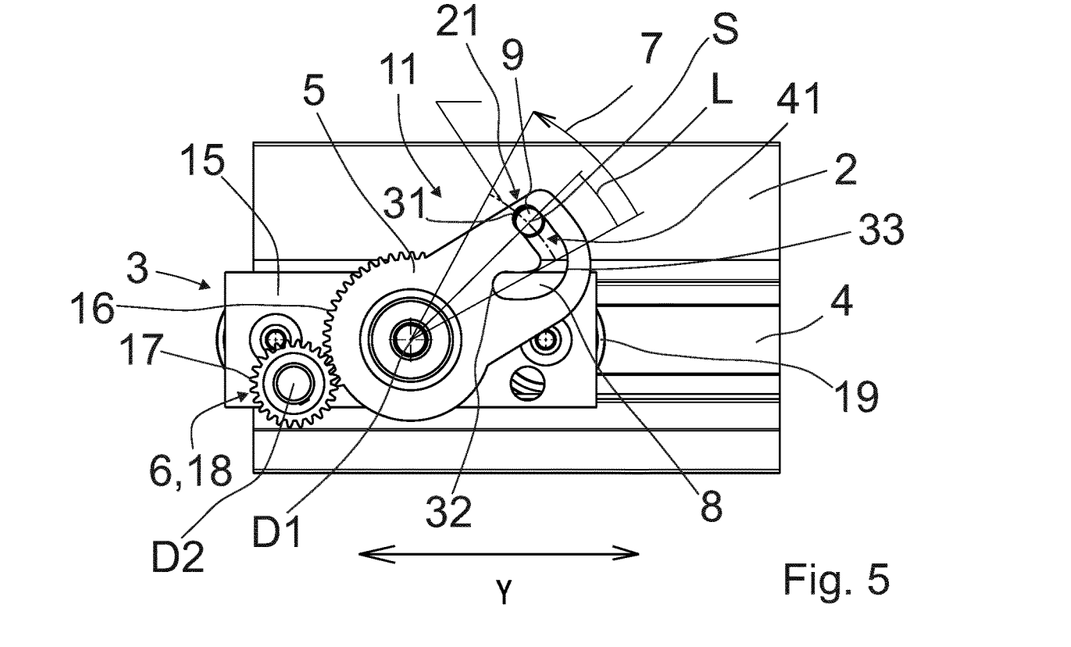
FIGS. 5-8 show schematic views of the unlocking process of a door system according to the disclosure, using a locking device as a part of the door system according to the disclosure.

The mode of operation of the disclosure in relation to the unlocking process of the door system proposed by the disclosure is explained below with reference to the FIGS. 5 to 8, wherein FIG. 5 shows a locking position and FIG. 8 an open position. In the locking position, which is shown in FIG. 5, of a locking device associated with the door system, the locking disk 5 is in a first final position 11. In the open position, which is shown in FIG. 8, of the locking device, the locking disk 5 is in a second final position 12.

Figure 6:
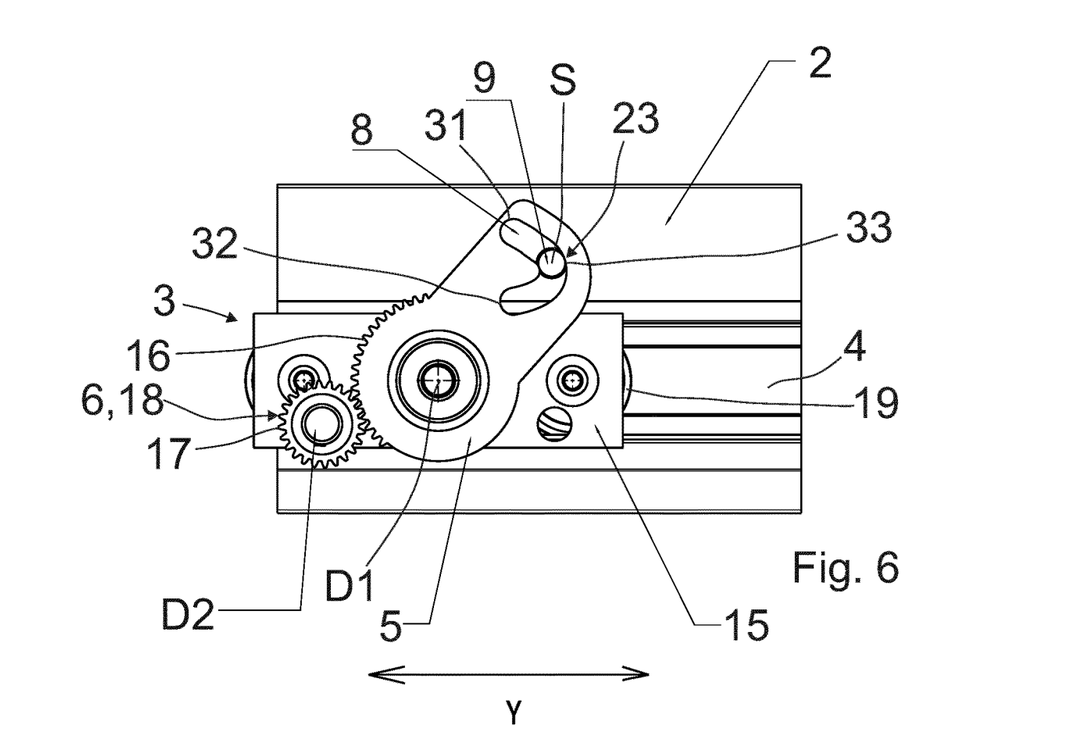
Figure 7:
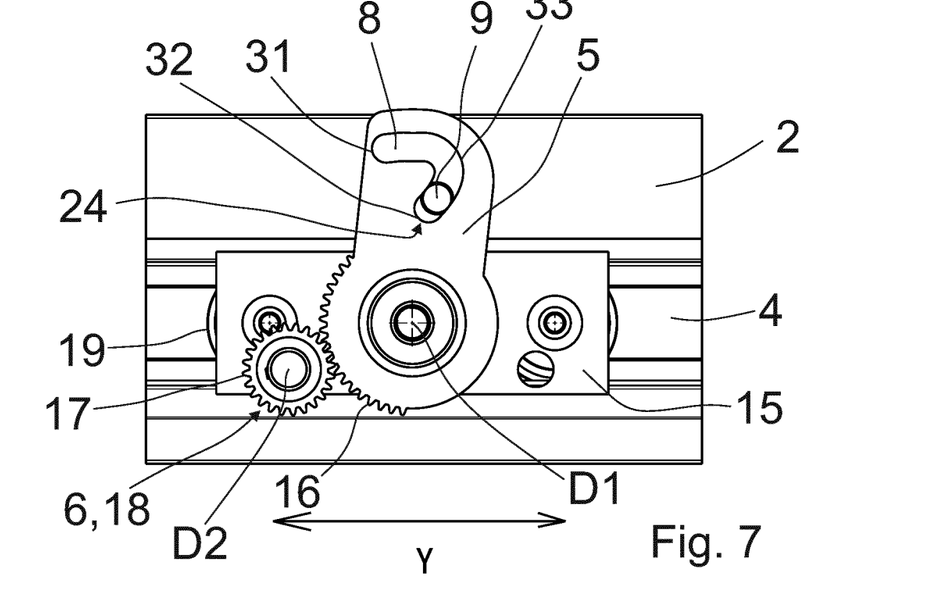

In the locking position (FIG. 5), the guide member 9 is positioned in a first end position 21 in the region of a first elongated-hole end 31 of the elongated-hole opening 8. The locking disk 5 can be pivoted by means of the drive device 6 or the drive member 18. During unlocking, the locking disk 5 is first pivoted by a free motion angle value L (FIGS. 5, 6). Due to the pivoting movement, the locking disk 5 is displaced relative to the guide member 9, so that the guide member 9 undergoes a change of position from the first end position 21 to an engaging position 23, wherein the engaging position 23 is a position in the region of the elongated-hole center 33 (see FIG. 6). In this case, the free motion angle value L corresponds to a change of position of the guide member 9 relative to the locking disk 5 from the first end position 21 in the region of the first elongated-hole end 31 to the engaging position 23 in the region of the elongated-hole center 33 (see FIGS. 5 and 6). When the locking disk 5 is pivoted by the free motion angle value L in the unlocking pivoting direction 7, there is no relative displacement of the slider plate 15 relative to the transverse beam 2; accordingly, the longitudinal beam 1 is not displaced relative to the transverse beam 2 in the process. The position of the locking disk 5 according to FIG. 6 corresponds to a dead-center-like position, in which a displacement of the slider plate 15 (and thus of the longitudinal beam 1) in the vehicle transverse direction Y is prevented.

In contrast, the locking disk 5 is in an over-dead-center-like position in the locking position according to FIG. 5. In relation to a transverse vehicle plane, which extends parallel to the transverse beam 2 and perpendicularly to the longitudinal beam 1, the center point of an imaginary segment of a circle, which extends along a leg 41 of the elongated hole that is directly adjacent to the first elongated-hole end 31, coincides with the axis of rotation D1 of the locking disk 5. When the locking disk 5 is pivoted by the free motion angle value L, the arrangement in space (or spatial arrangement) of the axis of rotation D2 of the drive member 18, the axis of rotation D1 of the locking disk 5 and an axis of symmetry S of the guide member 9 is constant. From this geometric relation results the possibility of a free rotation of the locking disk 5 by the angle value L.

Figure 8:
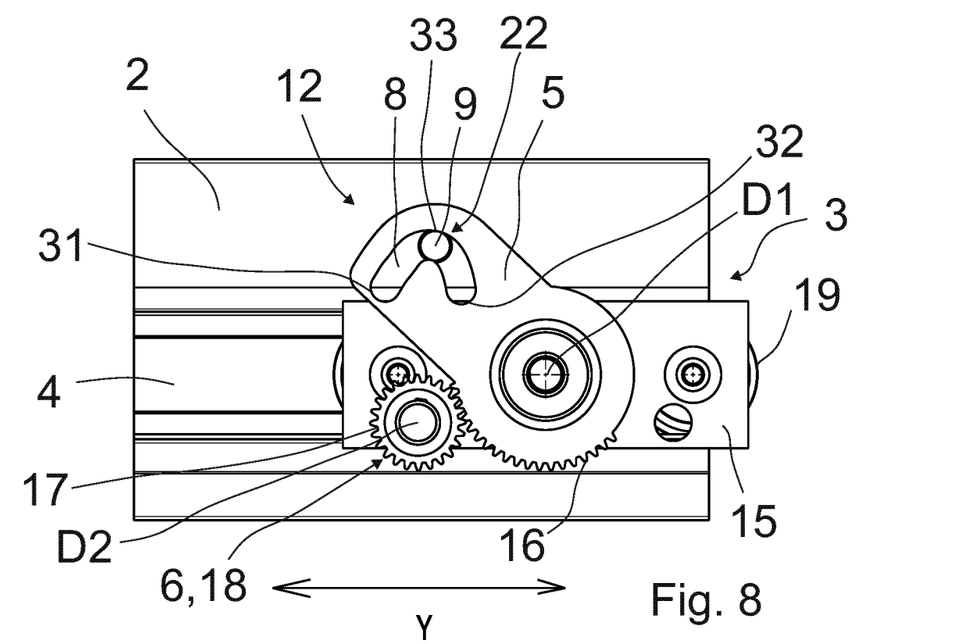

When the locking disk 5 is pivoted beyond the free motion angle value L in the direction of the unlocking pivoting direction 7 during unlocking, the locking disk 5 is displaced relative to the guide member 9 such that the guide member 9 undergoes a change of position from the engaging position 23 (FIG. 6) via an intermediate position 24 in the region of a second elongated-hole end 32 (position according to FIG. 7) to a second end position 22 in the region of the elongated-hole center 33 (FIG. 8). In the process, a displacement of the slider plate 15 including the components connected therewith also occurs. Accordingly, a relative displacement of the longitudinal beam 1 relative to the stationary transverse beam 2 takes place. The locking process corresponds to a reversal of the sequence of steps shown in FIGS. 5 to 8.

The invention claimed is:

1. A door system for a vehicle comprising a door leaf configured to be moved from a closed state into an open state and vice versa, the door system comprising
   a. a longitudinal beam extending along a longitudinal vehicle axis (X) and having a longitudinal guide in which the door leaf is movably guided;
   b. a transverse beam arranged firmly on the vehicle, which extends along a transverse vehicle axis (Y) substantially perpendicularly to the longitudinal beam, wherein the longitudinal beam is movably guided via a guiding device in a transverse guide of the transverse beam;
   c. a locking device configured for blocking a relative displacement between the longitudinal and transverse beams in a locking position and for enabling a displacement of the longitudinal beam relative to the transverse beam in an open position;
   wherein the locking device comprises a locking disk pivotably mounted on the guiding device, wherein the locking disk is pivotable, using a drive device operatively connected to the locking disk, and while carrying out an unlocking pivoting movement, from a first final position to a second final position when unlocking the locking device, and wherein the longitudinal beam and the transverse beam, when carrying out the unlocking pivoting movement, are non-displaceable relative to each other over a predetermined free motion angle value (L) of the locking disk,
   wherein the locking disk has an elongated-hole opening formed as a curve and in which a guide member, which is non-displaceably arranged on the transverse beam, is at least partially accommodated and guided.

2. The door system according to claim 1, wherein for locking the locking device, the locking disk is pivotable from the second final position to the first final position using the drive device, and while carrying out a locking pivoting movement.

3. The door system according to claim 1, wherein in the locking position, the guide member is positioned in a first end position in the region of a first elongated-hole end.

4. The door system according to claim 1, wherein the elongated-hole opening is configured such that the locking disk, when pivoting it by the free motion angle value (L), is displaced relative to the guide member such that the guide member undergoes a change of position from the first end position to an engaging position, wherein the engaging position is a position in the region of the elongated-hole center.

5. The door system according to claim 4, wherein the elongated-hole opening is configured such that the locking disk, when the locking disk is pivoted beyond the free motion angle value (L), is displaced relative to the guide member such that the guide member undergoes a change of position from the engaging position via an intermediate position in the region of a second elongated-hole end to a second end position in the region of the elongated-hole center.

6. The door system according to claim 3, wherein the second end position of the guide member relative to the locking disk corresponds with the locking an opening position of the locking device.

7. The door system according to claim 1, wherein the guiding device has a guiding bar, which is accommodated at least in some portions in a guiding sleeve of the longitudinal beam, and wherein the guiding bar is non-displaceably and non-rotatably connected to a slider plate, which is displaceably mounted in the transverse guide of the transverse beam with a sliding device.

8. The door system according to claim 7, wherein the locking disk is rotatably mounted on an outside section of the guiding bar.

9. The door system according to claim 7, wherein the guiding bar and the slider plate connected therewith provide a carrier assembly for the longitudinal beam, which is configured for carrying along the longitudinal beam when the carrier assembly is displaced relative to the transverse beam.

10. The doors system according to claim 1, wherein the locking disk is arranged between the longitudinal beam and the transverse beam, and that the slider plate is arranged between the locking disk and the transverse beam.

11. The door system according to claim 1, wherein the elongated-hole opening extends across a section of the locking disk in an arc-shape.

12. The door system according to claim 1, wherein the free motion angle value (L) corresponds to a change of position of the guide member relative to the locking disk from the first end position in the region of the first elongated-hole end to the engaging position in the region of the elongated-hole center.

13. The door system according to claim 1, wherein a toothed portion, with which a toothed portion of a drive member, engages, is disposed on the locking disk.

14. The door system according to claim 1, wherein the locking disk and the drive member are rotatably mounted on axes of rotation that are parallel to each other.

15. The door system according to claim 1, wherein, in relation to a transverse vehicle plane, which extends parallel to the transverse beam and perpendicularly to the longitudinal beam, the center point of an imaginary segment of a circle, which extends along a leg of the elongated hole that is directly adjacent to the first elongated-hole end, coincides with the axis of rotation of the locking disk.

16. The door system according to claim 1, wherein the locking device is configured and arranged such that, when the locking disk is pivoted by the free motion angle value (L), an arrangement in space of the axis of rotation of the drive member, the axis of rotation of the locking disk and an axis of symmetry(S) of the guide member relative to one another is constant.

17. The door system according to claim 1, wherein the guide member is a guiding cam.

18. A vehicle with a door system configured in claim 1.

* * * * *